United States Patent [19]
Phillips et al.

[11] 3,829,590
[45] Aug. 13, 1974

[54] METHOD OF UPGRADING WHEAT
[75] Inventors: Dale P. Phillips, 509 S. Garfield St., Enid, Okla. 73701; Jefferson S. Schlesinger, Enid, Okla.
[73] Assignee: said Phillips, by said Schlesinger
[22] Filed: May 5, 1972
[21] Appl. No.: 250,645

[52] U.S. Cl. .................. 426/478, 426/388, 209/2, 209/233
[51] Int. Cl. .............................. A23l 1/10
[58] Field of Search ............... 99/80 R, 80 PS, 93; 209/318, 233, 234, 142, 2; 426/478, 388

[56] References Cited
UNITED STATES PATENTS
3,038,603  6/1962  Grandke ..................... 209/318 X OTHER PUBLICATIONS
Shuey "Cereal Science Today" Vol. 5, No. 3, March 1960 pages 71, 72, 75.
Hlynka "Wheat Chemistry and Technology "American Association of Cereal Chemists, Inc., St. Paul, Minn. 1964, pages 21 26, 36–38, 41–52.
Perry et al., "Chemical Engineer's Handbook" McGraw–Hill Book Co. Inc., New York 4th Edition 1963 pages 21–51.

Primary Examiner—Raymond N. Jones
Attorney, Agent, or Firm—Dunlap, Laney, Hessin, Dougherty & Codding

[57] ABSTRACT

A method for upgrading random wheat lots which comprises classifying wheat kernels in the lot according to kernel size so as to segregate kernels of relatively large size from kernels of relatively smaller size whereby certain high protein fractions may be derived from the lot and the total value of the lot upgraded.

7 Claims, No Drawings

METHOD OF UPGRADING WHEAT

BACKGROUND OF THE INVENTION

1. Field of the Invention

This invention relates to the marketing of wheat, and more particularly, to a method of handling bulk wheat lots to segregate wheat kernels having a higher protein content than other kernels in the lot.

2. Brief Description of the Prior Art

The quality of breads and other baked wheat products is directly related to the protein content of the wheat flour used in the baking process. As contrasted with this desideratum, wheat cereals are generally made from a wheat stock of lower protein content. Efforts have been made to improve the baking quality of wheat through improving the varieties of wheat, horticultural practices, such as fertilization, and classification of particles of wheat flour by air currents and the like. Attention has also recently been directed toward determining the correlation between wheat color and protein content. The importance of color differences is evidenced by the wheat classification system of the U.S. Department of Agriculture, which system is based largely upon color. Moreover, recent work at Kansas State University has confirmed that there is a relationship between the amount of so-called yellowberry kernels in a sample of wheat, and the protein content of the samples. The higher the percentage of the kernels which are yellowberry kernels (as contrasted with dark, hard vitreous kernels), the lower is the protein content of the sample. Since, in general, relatively high protein wheat demands a high value in many markets, provided the grains are not damaged, or shrunken and broken, a colorimetric, or other method, for classifying bulk lots of wheat according to protein content of the kernels in each fraction would be a highly useful process. This is especially true since the high yellowberry content fractions left upon removal of the more valuable dark kernels generally encounter no price penalty or mark-down in relation to the mixed parent lot. Moreover, very low protein wheats may, on occasion, command a premium when sold for certain end uses, such as for cereal production. No automatic colorimetric method for effecting such separation has, to our knowledge, been developed to the present time. Neither have other methods of isolating the valuable proteinrich kernels been proposed for commercial usage.

BRIEF DESCRIPTION OF THE PRESENT INVENTION

The present invention evolved from numerous experiments, and efforts extending over several years, to identify a characteristic or property of wheat kernels which could be made the basis of an effective, commercially useful method for classifying or dividing wheat kernels into fractions of varying protein content, and thereby upgrading bulk lots of the grain.

Broadly described, the present invention comprises the process of classifying wheat in an unsegregated bulk lot to divide the kernels of wheat into at least two fractions of differing kernel size, which two fractions each differ in a repeatable manner from the average protein content of each other and of the parent unsegregated lot. Our invention is based upon our discovery that there is a direct correlation between the size of wheat kernels and the protein content thereof. We have further observed, incidental to this discovery, that there further appears to be a fairly good correlation between the color characteristics of wheat kernels and the kernel size. Thus, by separating the relatively larger kernels from the kernels of smaller size, we have been able, with numerous bulk lots of wheat moving in regular channels of commerce, to repeatedly isolate protein rich fractions of the lot from fractions of lower protein content.

In a preferred embodiment of the invention, the wheat is classified by screening, or other suitable kernel size classification method, into several fractions. The fraction of lowest protein content is one in which the kernels are retained on a screen having an opening between adjacent wires thereof of from 0.10 inch to about 0.13 inch. A second fraction contains kernels passing through the first mentioned screen, but retained upon a second screen having an opening between adjacent wires thereof of from 0.093 inch to about 0.094 inch. A third fraction is that which passes through the last mentioned screen. It is further contemplated that further classification can be made using additional or intermediate screens, depending upon the selectivity sought, and the particular prevailing market demands.

An important and broad object of the present invention is to provide a commercially useful process for quickly segregating from bulk wheat lots and shipments, wheat kernels of relatively high protein content.

A related object of the invention is to provide a process for isolating from bulk, unclassified wheat, kernels having a significantly lower protein content than the average protein content of the unsegregated wheat.

An additional object of the invention is to provide a method for concurrently classifying wheat kernels according to protein content, and removing from the unclassified mass of wheat, shrunken and broken kernels of low economic value.

Additional objects and advantages of the invention will become apparent as the following detailed description of preferred embodiments of the invention is read.

DETAILED DESCRIPTION OF A PREFERRED EMBODIMENT OF THE INVENTION

In carrying out the invention, the bulk lots of wheat as they may be obtained from storage elevators or railroad cars are subjected to a kernel size classification process which, in a preferred embodiment of the invention, consists of passing the kernels through one or more screens to thereby develop fractions in which the average particle size of one fraction differs from the average particle size of another fraction. The fractions as thus developed differ from each other in average protein content, and thus differ in value, according to the market in which the grain is to be sold.

In a preferred method of practicing the invention, the classification according to kernel size is preferably carried out to obtain a fraction having relatively larger kernels therein, and having a U.S. Dept. of Agriculture grade and classification which is at least the economic equivalent of the grade and classification of the original unsegregated wheat lot, and which is of an average protein content sufficiently high that this fraction is not subject to an economic penalty. A second fraction which is of smaller average kernel size than the first fraction has a substantially higher protein content than the average protein content of the first fraction, so that the second fraction can be marketed at a premium with respect to both the first fraction and the parent unsegregated lot.

The classification of the wheat kernels according to kernel size is preferably accomplished by moving the kernels of the unsegregated lot into contact with a stationary, or preferably, a moving or vibrating screen, so that the kernels of relatively smaller size pass through the screen to develop the second fraction referred to above. This initial screening of the kernels is preferably carried out with a screen constructed so that adjacent wires thereof are separated by a distance of from about 0.10 inch to about 0.13 inch. Screens in which this size opening is utilized include U.S. Standard Testing Sieves (Tyler) ranging from a No. 7 to a No. 6 sieve.

In addition to the primary classification accomplished by the single screen pass described, it is desirable to subject the kernels to a second screening step in which those kernels which have passed through the first screen described above are further screened to develop an additional fraction of kernels sufficiently small to pass through the second screen. In the second screening stage, the second screen preferably has an opening between adjacent wires thereof of from about 0.093 inch to about 0.094 inch.

Further classification, if desired, can be carried out by further screening stages or by the use of screens intermediate in their opening size between those described. In the most preferred method of carrying out the process of the invention, the screen of smallest openings between wires is defined as one in which the openings are from about 0.093 inch to about 0.094 inch. By subjecting the kernels to screening using a screen of this type, the kernels which pass the openings in such screen have been found by our observations to be those kernels which tend to be shrunken and broken kernels having a relatively high protein content, but being subject to downgrading in the usual standardized grading procedures because of their physical appearance.

The following examples are illustrative of the practice of the present invention, and demonstrate the effectiveness of the procedure of the invention in developing wheat fractions of relatively high protein content.

EXAMPLE 1

A 1,000 gm. aliquot of No. 1 grade hard red winter wheat was subdivided into five 200 gm. aliquots, and each of these was sifted for one minute on a Seedburo Sedimentation Sifter equipped with a No. 6 U.S. Standard Testing Sieve. This screen had a spacing between adjacent wires of 0.132 inch. The kernels of wheat which passed through the No. 6 sieve were collected, and the "thrus" from each aliquot were blended, and were sifted for 1 minute on a No. 7 U.S. Standard Testing Sieve in aliquots not exceeding 200 gms. in weight. The kernels passing through the No. 7 sieve (0.111 inch openings) were then sifted on a No. 8 U.S. Standard Testing Sieve (0.094 inch between adjacent wires) in aliquots not exceeding 200 gms. in weight.

The fractions which were obtained were analyzed for protein content and the results of such analysis are set forth in Table 1.

TABLE I

| Fraction | Description | Wt. Percent of Total | Wt. Percent Protein |
|---|---|---|---|
| 1 | Control (Parent) | 100 | 11.90 |
| 2 | overs - No. 6 | 15.3 | 10.95 |
| 3 | overs - No. 7 | 56.8 | 11.40 |
| 4 | overs - No. 8 | 25.1 | 12.55 |
| 5 | thrus - No. 8 | 2.8 | 13.85 |

The data reported in Table I show that a substantial gain in protein content is achieved in that fraction of the wheat which is retained on the No. 8 sieve, and which constitutes about 25 percent of the parent sample. It was further observed that although the kernels passing through the No. 8 screen showed a significantly higher level of protein than those retained on this screen, the kernels in this "thru" fraction were for the most part shrunken and broken kernels subject to downgrading by existing grading standards due to this visual appearance. It may be observed, however, that this fraction, constituting 2.8 weight percent of the total parent sample can be blended back into the second or third fraction to slightly increase the protein content in either case without resulting in the downgrading of either of these fractions due to the retained overall visual appearance of the entire fraction.

EXAMPLE 2

The grading standards established by the United States Department of Agriculture include, as one criteria of grade, a certain minimum test weight per bushel. Thus, for example, in the case of hard red winter wheat, wheat of No. 1 grade must have a minimum test weight per bushel of 60 pounds.

In order to determine whether the particle size classification procedure described in Example 1 deleteriously affected the test weights of the several fractions, a sample of No. 1 hard red winter wheat having a test weight of 62.3 pounds per bushel was obtained, and was subdivided into aliquots not exceeding 200 grams. Each aliquot was sifted for one minute on a Seedburo Sedimentation Sifter equipped with a No. 7 U.S. Standard Testing Sieve. The "thrus" from this sieve were weighed and had a test weight of 60.7 pounds per bushel. The "thrus" of the No. 7 sieve were then divided into aliquots not exceeding 200 gms. in weight, and were sifted for one minute on a No. 8 U.S. Standard Testing Sieve. The "overs" from this screening were then composited and were weighed. A test weight for the "overs" of the No. 8 sieve of 61.0 pounds per bushel was obtained.

It may be seen from the data obtained that the fraction of wheat having a kernel size such that the kernels passed through a No. 7 sieve and retained on a No. 8 sieve can be extracted from the parent lot to effect a protein gain as demonstrated by Example 1, without suffering a loss in test weight of a magnitude such that a lower grade must be assigned to this fraction.

EXAMPLE 3

Twenty samples derived from various types of wheat moving in commerce through a grain elevator terminal point were obtained. The kernels passing through a No. 7 U.S. Standard Testing Sieve and retained on a No. 8 U.S. Standard Testing Sieve were separated from the parent fraction by screening aliquots of the parent samples not exceeding 200 gms for a period of one minute on a No. 7 screen mounted in a Seedburo Sedimentation Sifter. The "thrus" from the No. 7 sieve were sifted for one minute in aliquots not exceeding 200 gms. upon a No. 8 U.S. Standard Testing Sieve. The 7-8 (referring to sieve sizes) fractions from the several parent lots were then subjected to protein analyses. The results of these analyses, including the identification of the type of wheat making up the parent sample, are set forth in Table II.

TABLE II

| Sample | Type and Grade | Wt. % of 7-8 Fraction | Wt. % Protein in Parent | Wt. % Protein in 7-8 Fraction |
|---|---|---|---|---|
|  | * |  |  |  |
| 1 | 2 HHRW[1] | 27.00 | 12.00 | 12.85 |
| 2 | 2 HHRW | 25.25 | 11.70 | 12.15 |
| 3 | 1 HHRW | 27.25 | 12.15 | 12.80 |
| 4 | 2 HHRW | 25.50 | 11.80 | 12.80 |
| 5 | 1 YHW[2] | 25.50 | 11.60 | 12.80 |
| 6 | 1 YHW | 21.75 | 10.75 | 11.45 |
| 7 | 2 YHW | 23.20 | 10.85 | 11.90 |
| 8 | 2 YHW | 26.75 | 11.15 | 12.45 |
| 9 | 1 HHRW | 25.25 | 12.20 | 12.90 |
| 10 | 1 YHW | 22.75 | 10.70 | 11.50 |
| 11 | 1 YHW | 20.95 | 10.60 | 11.65 |
| 12 | 1 HDRW[3] | 32.00 | 13.50 | 13.80 |
| 13 | 1 YHW | 23.30 | 10.80 | 11.75 |
| 14 | 1 YHW | 23.00 | 10.55 | 11.30 |
| 15 | 1 HDRW | 30.80 | 13.00 | 13.50 |
| 16 | 2 YHW | 25.50 | 11.05 | 11.90 |
| 17 | 1 HHRW | 27.25 | 11.45 | 12.30 |
| 18 | 2 HDRW | 29.50 | 12.50 | 13.05 |
| 19 | 2 HDRW | 31.00 | 12.00 | 13.25 |
| 20 | 1 HHRW | 23.25 | 11.10 | 11.75 |

* Designates United States Department of Agriculture grade.
1 HHRW = heavy, hard red winter wheat
2 YHW = yellow, hard winter wheat
3 HDRW = heavy, dark, hard red winter wheat From the protein analyses reported in Table II, it will be perceived that in the case of each of the wheat classes, the fraction of the kernels passing through a No. 7 U.S. Standard Testing Sieve and retained on a No. 8 U.S. Standard Testing Sieve contains a markedly higher protein content than the parent fraction from which it was derived.

EXAMPLE 4

Seven samples of soft white wheats from different sources were initially analyzed for protein. 100 gram aliquots from each of these samples were then sifted for one minute on a No. 6 U.S. Standard Sieve mounted on a Seedburo Sedimentation Sifter. The "overs" on the No. 6 sieve were weighed and analyzed for protein. The "thrus" were sifted for one minute on a No. 7 U.S. Standard Sieve. The "overs" and "thrus" from the No. 7 sieve were then weighed and analyzed for protein. The results of these tests are set forth in Table III.

TABLE III

| Sample | Fraction | Weight Percent | Wt. Percent Protein |
|---|---|---|---|
| A | Parent-Control | 100 | 11.00 |
|  | "Overs" on No. 6 | 50 | 10.90 |
|  | "Overs" on No. 7 | 38 | 10.95 |
|  | "Thrus" No. 7 | 12 | 11.40 |
| B | Parent-Control | 100 | 10.55 |
|  | "Overs" on No. 6 | 44 | 10.40 |
|  | "Overs" on No. 7 | 44 | 10.70 |
|  | "Thrus" No. 7 | 12 | 10.75 |
| C | Parent-Control | 100 | 11.50 |
|  | "Overs" on No. 6 | 45 | 11.40 |
|  | "Overs" on No. 7 | 43 | 11.75 |
|  | "Thrus" No. 7 | 12 | 11.75 |
| D | Parent-Control | 100 | 10.60 |
|  | "Overs" on No. 6 | 47 | 10.35 |
|  | "Overs" on No. 7 | 41 | 10.70 |
|  | "Thrus" No. 7 | 12 | 11.10 |
| E | Parent-Control | 100 | 10.55 |
|  | "Overs" on No. 6 | 36 | 10.60 |
|  | "Overs" on No. 7 | 51 | 10.75 |
|  | "Thrus" No. 7 | 13 | 10.85 |
| F | Parent-Control | 100 | 11.40 |
|  | "Overs" on No. 6 | 44 | 11.20 |
|  | "Overs" on No. 7 | 44 | 11.45 |
|  | "Thrus" No. 7 | 12 | 11.80 |
| G | Parent-Control | 100 | 10.80 |
|  | "Overs" on No. 6 | 44 | 10.75 |
|  | "Overs" on No. 7 | 44 | 10.85 |
|  | "Thrus" No. 7 | 12 | 11.35 |

From the data obtained in the test and reported in Table III, it is shown that soft white wheat can be fractionated by kernel size classification to isolate fractions having a higher protein content than the parent lot.

EXAMPLE 5

A number of samples of yellow hard winter wheat were taken from numerous railroad cars moving in interstate commerce from various geographical locations to a grain terminal in Oklahoma between Dec. 1, 1970 and Feb. 28, 1971. An aliquot of each of these samples was submitted for protein analysis. A 200 gram aliquot of each sample was then sifted for one minute on a No. 7 U.S. Standard Sieve mounted on a Seedburo Sedimentation Sifter. The "thrus" from the No. 7 screen were sifted for one minute on a No. 8 U.S. Standard Sieve. The "overs" on the No. 8 sieve were weighed and were submitted for protein analysis. Color determination was also carried out on a number of the 7-8 fractions obtained from the parent samples. The data obtained in these tests are set forth in Table IV.

TABLE IV

| Run | Origin | Grade* | Wt. Percent Protein Parent | 7-8 Fraction | Wt. Percent, 7-8 Fraction | Color** |
|---|---|---|---|---|---|---|
| 1 | Helena, Okla. | 1HYHW | 11.05 | 11.90 | 21.0 | — |
| 2 | Wakita, Okla. | 1YHW | 11.00 | 12.10 | 23.0 | — |
| 3 | Wakita, Okla. | 2YHW | 11.30 | 12.10 | 23.0 | — |
| 4 | Harper, Ks. | 1HYHW | 10.80 | 11.30 | 15.0 | 28 |
| 5 | Helena, Okla. | 2YHW | 11.00 | 12.10 | 24.0 | 57 |
| 6 | Goltry, Okla. | 1HYHW | 11.20 | 12.10 | 22.5 | 42 |
| 7 | Newkirk, Okla. | 1HYHW | 10.90 | 11.65 | 22.0 | 30 |
| 8 | Perry, Ok. | 3YHW | 11.25 | 11.90 | 30.0 | 44 |
| 9 | Perry, Ok. | 5YHW | 11.30 | 12.20 | 28.0 | 44 |
| 10 | Apache, Okla. | 3HYHW | 11.50 | 12.15 | 26.5 | 42 |
| 11 | Garber, Okla. | 2YHW | 10.90 | 12.15 | 27.5 | 48 |
| 12 | Hillsdale, Okla. | 1HYHW | 11.70 | 12.15 | 25.5 | 45 |
| 13 | Mulhal, Ok. | 2YHW | 11.40 | 12.10 | 32.0 | 23 |
| 14 | Banner, Ok. | 1YHW | 11.20 | 12.10 | 25.5 | 40 |
| 15 | Perry, Okla. | 1HYHW | 10.70 | 11.00 | 22.0 | 30 |
| 16 | Perry, Okla. | 2YHW | 10.60 | 11.55 | 20.5 | 30 |
| 17 | Wakita, Okla. | 1YHW | 12.10 | 12.65 | 27.5 | 56 |
| 18 | Helena, Okla. | 1YHW | 10.80 | 12.20 | 23.0 | 43 |
| 19 | Nash, Ok. | 1YHW | 11.35 | 12.15 | 24.5 | 34 |
| 20 | Cheney, Ks. | 1YHW | 10.75 | 11.65 | 25.5 | 40 |
| 21 | Medicine Lodge, Ks. | 2YHW | 11.05 | 11.85 | 27.5 | — |
| 22 | Red Rock, Okla. | 3YHW | 11.00 | 12.00 | 27.5 | 48 |
| 23 | Orienta, Okla. | 1YHW | 11.15 | 11.80 | 27.0 | 50 |
| 24 | Orienta, Okla. | 2YHW | 11.25 | 12.20 | 24.0 | 40 |
| 25 | Tonkawa, Okla. | 1HYHW | 10.70 | 11.40 | 23.0 | 40 |
| 26 | Nardin, Okla. | 1YHW | 11.15 | 11.95 | 26.5 | 35 |
| 27 | Kildare, Okla. | 2HYHW | 11.30 | 11.80 | 25.0 | 38 |
| 28 | Nash, Ok. | 2YHW | 11.10 | 12.40 | 25.5 | 36 |
| 29 | Carrier, Okla. | 1HYHW | 11.00 | 11.90 | 19.0 | 20 |
| 30 | Burlington, Kansas | 1HYHW | 11.90 | 12.20 | 18.0 | — |
| 31 | Cunningham, Kansas | 2HYHW | 11.35 | 11.55 | 24.5 | — |
| 32 | Medford, Okla. | 1HYHW | 11.00 | 11.60 | 20.5 | — |
| 33 | Marland, Okla. | 1HYHW | 10.90 | 11.30 | 25.5 | — |
| 34 | Freedom, Okla. | 2HYHW | 11.00 | 11.40 | 25.5 | — |
| 35 | Medicine Lodge, Ks. | 1YHW | 11.00 | 12.00 | 27.0 | — |
| 36 | Blackwell, Okla. | 1YHW | 11.50 | 11.80 | 22.0 | — |
| 37 | Okeene, Okla. | 2YHW | 10.70 | 11.75 | 27.5 | — |
| 38 | Deer Creek, Ok. | 1YHW | 11.30 | 12.20 | 22.5 | — |

*Grading and classification are as described in Table II except that HYHW signifies heavy yellow hard winter wheat.
**In the color analysis, the percentage of the total wheat kernels in the fraction which are hard red winter wheat class kernels is determined. If this percentage is higher than 40 percent, but less than 75 percent, the wheat is classed as hard winter wheat under the United States Department of Agriculture classification system. It is a more valuable subclass of wheat than the yellow hard winter wheats making up the parent lots.

The data set forth in Table IV show that in every instance, a protein gain was realized through the use of the kernel size classification system. The average gain was 0.77 percent. The No. 7 – No. 8 fractions averaged 24.38 weight percent of the parent fraction.

EXAMPLE 6

A 250 gram aliquot of yellow hard winter wheat was visually tested for the presence of shrunken and broken kernels, and these kernels were separated from this sample and weighed to determine the percentage of shrunken and broken kernels in the parent lot of the yellow hard winter wheat. This was found to be 3.1 weight percent. Six 200 gram aliquots of the parent sample were then each subjected to sifting for one minute on a No. 7 U.S. Standard Sieve mounted on a Seedburo Sedimentation Sifter. The "overs" from the No. 7 sieve runs of the six aliquots were combined, blended, weighed and tested for shrunken and broken kernels in the same manner as the 200 gram aliquot taken from the parent sample. The "thrus" from the No. 7 screen of the six aliquots were each sifted for one minute on a No. 8 U.S. Standard Sieve. The "overs" of the No. 8 sieve runs were combined, blended, weighed and tested for shrunken and broken kernels. The "thrus" from the No. 8 sieve runs were combined, blended, weighed and tested for shrunken and broken kernels. The data obtained is reported in Table V.

TABLE V

| Fraction | Weight, Grams | Weight Percent | Weight, gms Shrunken & Broken | Wt. Percent of S & B Kernels |
| --- | --- | --- | --- | --- |
| Parent | 1200 | 100 | 37.2 | 3.1 |
| "Overs" on No. 7 | 841 | 70 | 0.8 | 0.1 |
| "Overs" on No. 8 | 308 | 25.7 | 8.6 | 2.8 |
| "Thrus" No. 8 | 51 | 4.3 | 27.8 | 54.5 |

From the data reported in Table V, it will be perceived that most of the shrunken and broken kernels present in the parent wheat lot pass into the fraction which passes through the No. 8 U.S. Standard Sieve. The protein gain which has thus been found to occur in the case of the 7–8 fraction is not due to any concentration of the shrunken and broken kernels in this fraction, but rather is due to the concentration of small, sound kernels of high protein content. This example demonstrates that the kernel size classification procedure of the present invention can improve the United States Department of Agriculture grade of the wheat lot by removing shrunken and broken material from the fraction retained on the No. 7 screen, and also from the fraction which passes the No. 7 sieve and is retained on the No. 8 sieve.

EXAMPLE 7

A sample of heavy hard red winter wheat weighing 8,000 grams was continuously fed at a rate of 2,205 grams per minute to the top of a laboratory gyratory sifter manufactured by the General Mills Equipment Company of Kansas City, Missouri. This sifter was modified by clothing two top screens of 7½ × 7½ inch dimensions with No. 7 sieve having 0.028 inch diameter wires (0.115 inch sieve openings). A third and lower frame in the sifter was clothed with a No. 8 sieve having 0.32 inch diameter wires (0.094 inch sieve openings). The "thrus" from the first No. 7 sieve were directed to the No. 8 sieve, and the "overs" from the first No. 7 sieve were directed to the second No. 7 sieve for further screening (effectively doubling the total screening area of the No. 7 sieve deck). The laboratory gyratory sifter gyrated in a two inch circle at a rate of about 180 gyrations per minute, and was gyrated for 1 minute after all wheat had been charged thereto.

The "overs" from the second (lowermost) No. 7 sieve were collected, weighed and analyzed for protein content, as were the "overs" on the No. 8 sieve, and the "thrus" from the No. 8 sieve. The results are reported in Table VI.

TABLE VI

| Fraction | Grams | Weight Percent | Weight Percent Protein |
| --- | --- | --- | --- |
| Parent lot control | 6740* | 100 | 11.15 |
| "Overs" No. 7 | 4817 | 70.1 | — |
| "Overs" No. 8 | 1824 | 27.1 | 11.80 |
| "Thrus" No. 8 | 99 | 1.3 | — |
| Loss in sifter | 60 | 0.9 | — |

*Weight percentages, except loss, are based on 6740 grams actually passed and recovered, rather than the 7000 grams introduced prior to loss.

The results set forth in Table VI show that the process of the invention can be effectively carried out dynamically with a continuously flowing wheat stream.

Although the description of the invention has thus far been directed to the preferred method of practicing the invention in which screens or sieves of certain types have been used to classify or fractionate the parent lots, it will be understood that other methods can be used for such classification by kernel size, and the most basic description of the invention is therefore in terms of the size of the wheat kernels in the several fractions constituting the end products of the method. The most desirable fraction, from the standpoint of protein upgrading, is that made up of kernels which will pass through a sieve about the size of a No. 7 U.S. Standard Sieve and be retained on a sieve about the size of a No. 8 U.S. Standard Sieve. This fraction contains wheat kernels having diameters ranging from about 0.093 inch to about 0.13 inch. The kernels in the fraction of No. 7 "overs" and No. 6 "thrus" have diameters ranging from about 0.10 inch to about 0.140 inch. The No. 6 "overs" have diameters exceeding about 0.135 inch, and the No. 8 "thrus" have diameters of less than about 0.0940 inch.

It will be understood that various modifications and refinements can be effected in the practice of the invention without departure from the basic principles thereof. Changes of this type are therefore deemed to be circumscribed by the spirit and scope of the invention except as the same may be necessarily limited by the appended claims or reasonable equivalents thereof.

What is claimed is:
1. A method for producing whole wheat grain product of relatively high protein content comprising:
screening an unsegregated a raw wheat lot containing kernels ranging in diameter from less than 0.093 inch to more than 0.14 inch and having an average protein content of at least 10 weight percent to sep- arate the kernels into two fractions, one of which fractions is retained on a sieve having openings between the wires thereof of about 0.111 inch, and the other of which fraction passes through said sieve; then screening said other fraction which passes through said sieve to remove therefrom a major portion of the kernels therein which will pass through a sieve having openings between the wires thereof of about 0.094 inch.

2. The method defined in claim 1 wherein said screening is carried out by continuously directing said raw wheat lot against said first-mentioned sieve by gravitational fall, with said second sieve positioned thereunder and said sieves undergoing a gyratory movement.

3. A method for upgrading the protein content of bulk, unsegregated lots of wheat of the type generally characterized by its relatively smaller kernels having relatively higher protein content comprising:

classifying the kernels of wheat in the lot into two fractions including a first fraction which contains substantially all kernels from the parent lot having a size exceeding about 0.132 inch in diameter, and containing no kernels from the parent lot having a size of less than about 0.10 inch in diameter, and a second fraction containing substantially all of the kernels from the parent lot which are of smaller size than those contained in said first fraction whereby the wheat in said second fraction has a higher protein content than the wheat in said first fraction.

4. A method for quickly isolating from randomly sized wheat kernels of varying protein content, groups of kernels each having a substantially narrower range of protein content than the range of protein content of the kernels in said total lot of randomly sized kernels comprising sifting the kernels through a series of sieves of decreasing screen opening size to classify the kernels into kernel fractions each having substantially narrower ranges of diametric size than the range of kernel sizes characteristic of said total lot before sifting, said sieves including both a No. 7 U.S. standard sieve and a No. 8 U.S. standard sieve whereby one of said fractions of kernels contains substantially no kernels which will not pass through said No. 7 sieve, and no kernels which will pass through said No. 8 sieve.

5. A method for upgrading wheat lots as defined in claim 3, and further characterized in including the further step of classifying said kernels in said second fraction to remove from said second fraction a third fraction of the parent lot which contains kernels having a size of less than about 0.094 inch in diameter.

6. A method for upgrading wheat lots as defined in claim 5 and further characterized in including the step of blending the third fraction of the wheat containing kernels having a size of less than 0.094 inch in diameter with said first fraction.

7. A method for upgrading wheat lots as defined in claim 3 and further characterized as including the step of removing from said second fraction, a major portion of the shrunken and broken kernels contained therein.

* * * * *